May 26, 1970         T. V. WAHL, JR                3,514,167
VENTURI-TYPE OIL SEAL SYSTEM FOR ENGINE CRANKSHAFTS OR THE LIKE
Filed July 3, 1968
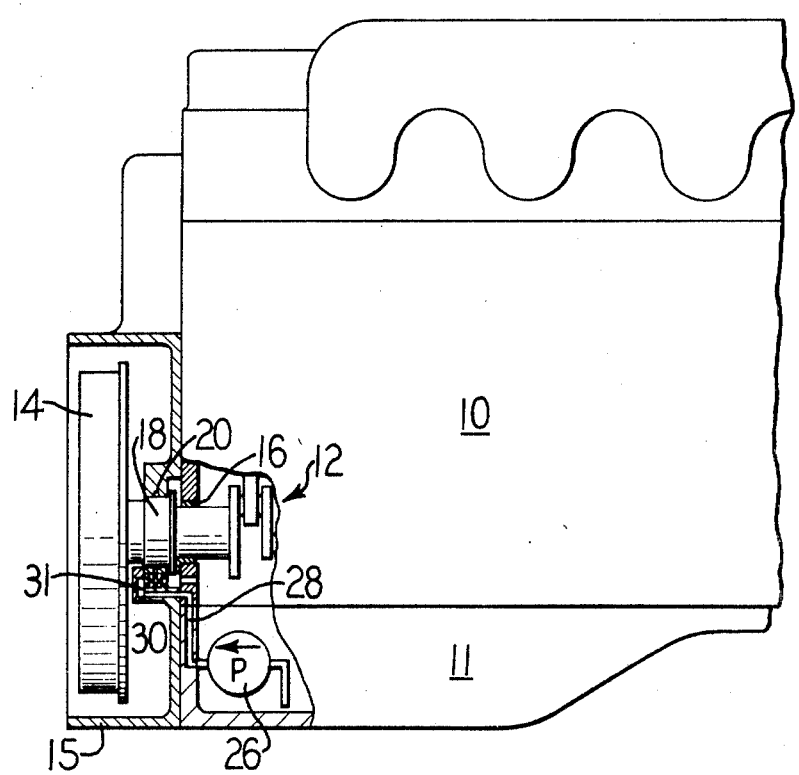
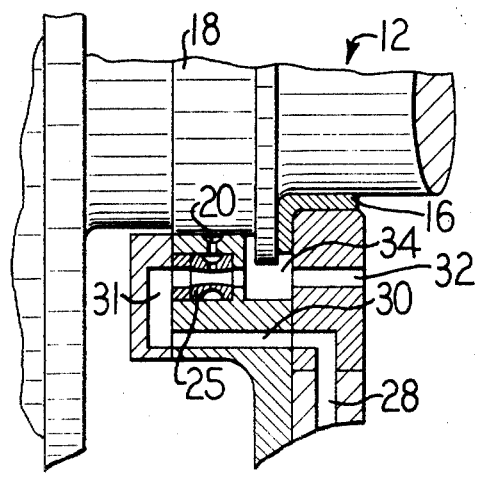
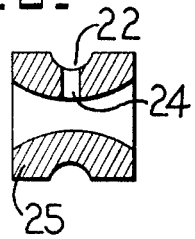
INVENTOR
THOMAS V. WAHL, JR.
ATTORNEYS 3,514,167
VENTURI-TYPE OIL SEAL SYSTEM FOR ENGINE
CRANKSHAFTS OR THE LIKE
Thomas V. Wahl, Jr., North Pekin, Ill., assignor to Caterpillar Tractor Co., Peoria, Ill., a corporation of California
Filed July 3, 1968, Ser. No. 742,257
Int. Cl. F04b 21/00; F04d 29/00, 29/08
U.S. Cl. 308—36.3                    1 Claim

ABSTRACT OF THE DISCLOSURE

A device for preventing the escape of engine lubricating oil from the engine crankcase to the flywheel housing by way of a main crankshaft bearing which device includes the use of a Venturi tube or restricted orifice through which oil is pumped in a manner and direction to create a low-pressure condition in the vicinity toward which oil tends to leak to draw the oil back into the crankcase.

---

Various types of seals have been employed to prevent leakage from the relatively high-pressure area of the crankcase of an engine into the lower pressure area of the flywheel compartment. The present trend toward operating engines at increasingly greater speeds has caused premature failures of conventional seals in this area. While it will be apparent as the description proceeds that the invention may have many applications, it will be described by way of example in connection with its use with the rear crankshaft bearing of an internal combustion engine.

It is an object of the present invention to provide effective sealing particularly in the area described without the use of sealing surfaces in contact and relative motion which are conducive to a high rate of wear. Further objects and advantages of the invention and the manner in which it is carried into practice are made apparent in the following specification wherein the invention is described in detail by reference to the accompanying drawing.

In the drawing:

FIG. 1 is a schematic view in side elevation of a portion of an internal combustion engine with parts broken away to disclose the location and general arrangement of the present invention;

FIG. 2 is an enlarged fragmentary view showing details of the invention; and

FIG. 3 is an enlarged sectional view of a Venturi tube which forms a part of the disclosure of FIG. 2.

In the drawing, an engine, a part of which is shown at 10, is illustrated as having a crankcase 11 for the reception of a supply of lubricating oil and also as having a crankshaft generally indicated at 12 with a flywheel 14 secured to one end thereof and contained in a flywheel housing 15, the open end of which is normally closed by other housing parts, such as that of the transmission or the like not herein shown.

Operating pressures in the engine block which encloses the crankshaft and in the crankcase are generally considerably in excess of the pressure prevailing in the flywheel compartment. As a result, leakage of oil occurs past a crankshaft main bearing shown at 16 (see also FIG. 2) which embraces a main journal of the crankshaft. It has been conventional practice to provide a seal beyond the main bearing surrounding an enlarged portion 18 of the crankshaft, and ordinary seals of the lip type as well as labyrinth seals have proven unsatisfactory in this area particularly in engines which are operated at very high speeds. The present invention, instead of the conventional seal, provides a groove 20 in an opening of the flywheel housing within which the enlarged portion 18 rotates and this groove communicates with an annular groove (see FIG. 3) and an orifice 24 which communicates with the throat of a Venturi tube 25 which is fitted into a suitable opening in the flywheel compartment adjacent to the crankshaft.

Referring back to FIG. 1, a pump 26 withdraws lubricating oil from the crankcase and directs it through passages 28, 30 and 31 to the Venturi tube where velocity increase caused by the reduced cross-sectional area of the throat creates a suction which evacuates oil from the groove 20 and directs it back to the interior of the engine block through a suitable port 32. Any suitable type of pump may be used and it will preferably be positioned to be conveniently driven by an operating part of the engine as is conventional practice, for example, with engine lubricating oil pumps.

The Venturi effect may also be obtained by arranging the port 32 coaxially with the Venturi element, thus creating a suction which tends to evacuate oil from a space 34 existing between the bearing 16 and the enlarged portion or seal area 18 of the crankshaft. With the arrangement disclosed, a very tight or bearing-type fit subject to rapid wear is not necessary in the seal area 18 of the crankshaft and the oil which tends to leak beyond that area into the flywheel compartment is returned to the crankcase before it leaves the area.

What is claimed is:

1. A system to prevent fluid from escaping from one compartment to another where a shaft extends through a wall which separates the compartments, said wall having a first opening embracing the shaft, a bearing between the shaft and the first opening, said wall having a second opening embracing the shaft, a groove in said wall encircling the shaft within the confines of said second opening to receive fluid tending to escape, means forming an annular space surrounding the shaft between the first and second openings to receive fluid which leaks past the bearing from said one compartment, Venturi tube means disposed within said wall between said first and second openings for withdrawing fluid from said groove, and a passage between said annular space and said one compartment in axial alignment with the Venturi tube means whereby a suction will be created to return fluid to said one compartment from said space, and pump means to direct fluid under pressure through said Venturi tube means.

References Cited

UNITED STATES PATENTS

| | | | |
|---|---|---|---|
| 1,474,454 | 11/1923 | Telfer. | |
| 1,737,870 | 12/1929 | Telfer. | |
| 2,575,923 | 11/1951 | McMahan et al. | 103—113 X |
| 2,879,867 | 3/1959 | Pike | 103—262 X |
| 2,931,314 | 4/1960 | Erikson et al. | 103—42 X |
| 3,180,273 | 4/1965 | Loliger | 103—204 X |
| 3,253,882 | 5/1966 | Deackoff | 103—204 X |

FOREIGN PATENTS 888,211   1/1962   Great Britain.

DONLEY J. STOCKING, Primary Examiner
W. J. KRAUSS, Assistant Examiner

U.S. Cl. X.R.
277—15, 18, 69